3,273,943
MATERIAL TRANSPORTING DEVICE
John D. Russell, Franklin, Pa., assignor to
Conair, Incorporated, Franklin, Pa.
Filed Dec. 11, 1962, Ser. No. 243,825
5 Claims. (Cl. 302—59)

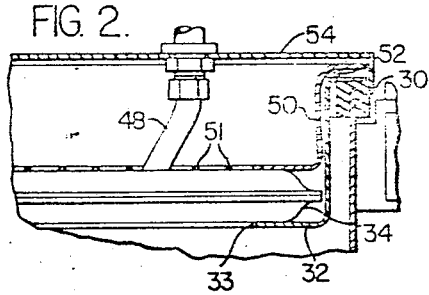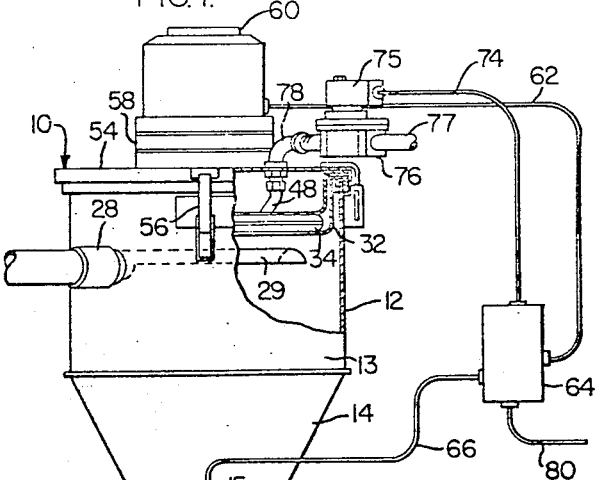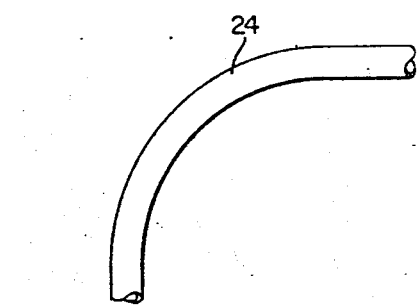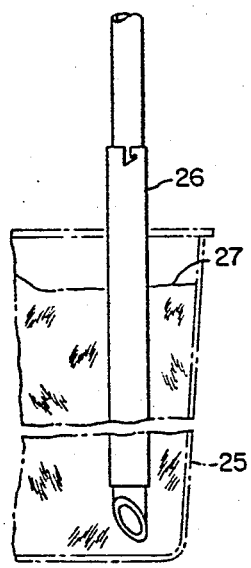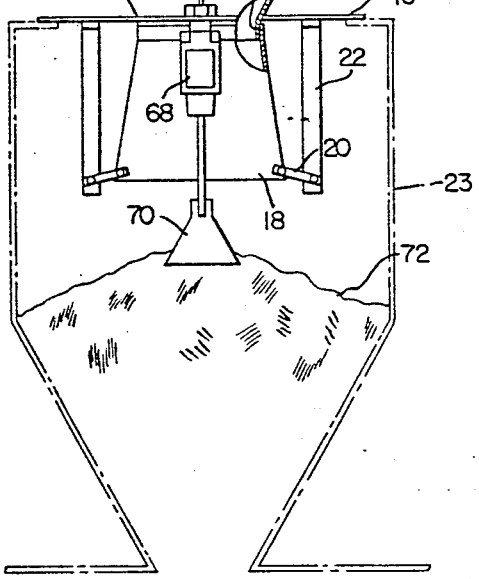
INVENTOR:
JOHN D. RUSSELL
ATTORNEY Sept. 20, 1966  J. D. RUSSELL  3,273,943
MATERIAL TRANSPORTING DEVICE
Filed Dec. 11, 1962  2 Sheets-Sheet 2
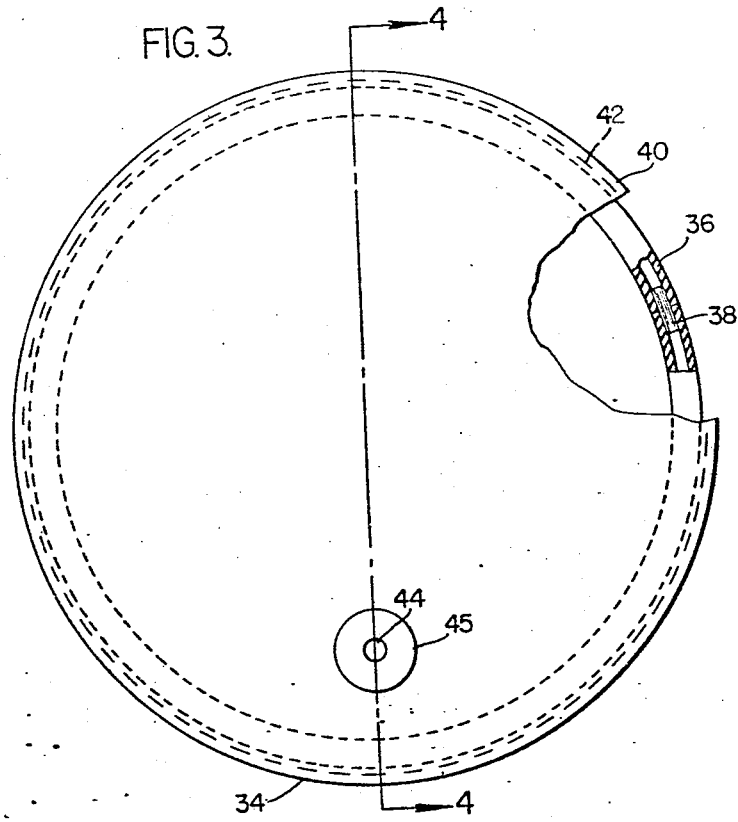
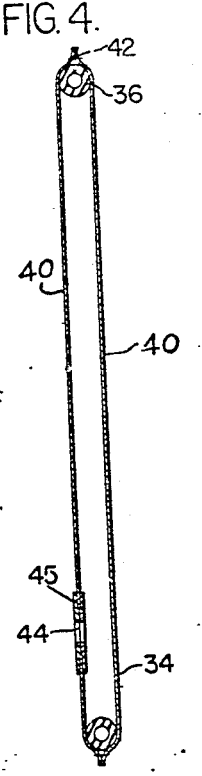
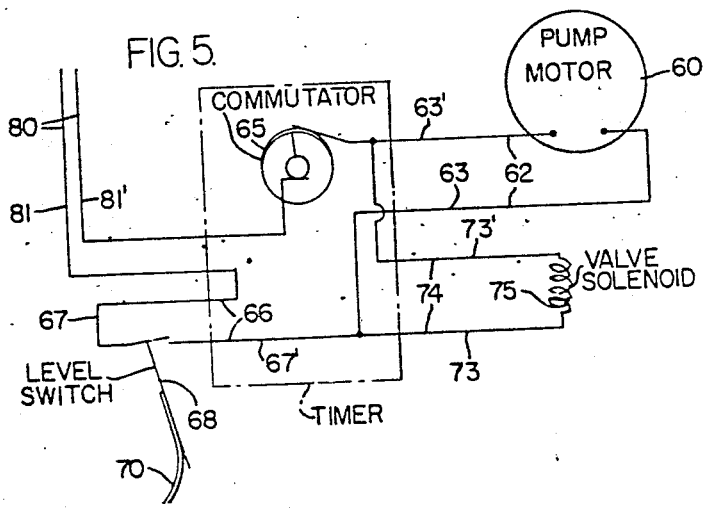
INVENTOR:
JOHN D. RUSSELL
BY
ATTORNEY United States Patent Office 3,273,943
Patented Sept. 20, 1966

This invention relates to a material transporting device and more particularly to a material loader for transporting finely divided or granular material from a storage bin to the hopper of a machine needing a substantially constant supply of such material.

In many industries such as the plastic industry it is common practice to transport finely divided, granular or pulverant material from a storage bin, through a feed pipe having an end embedded in the material to be transported, to a material receiving chamber by creating a vacuum in the receiving chamber so that the resultant air flow through the material into the feed pipe causes the material to be fluidized and entrained in the air stream. Th air stream carrying the material entrained therein enters the chamber and the material is deposited within the chamber while the air is withdrawn therefrom by a vacuum pump. Although nearly all of material is deposited within the chamber a certain quantity of extremely fine, dusty or fume material is still entrained in the air stream and must be removed therefrom by filtering to minimize the escape of said dust or fumes to the atmosphere.

The filters employed for such purposes have been quite satisfactory for certain types of material but have not been satisfactory under all conditions of service because of the clogging characteristics of certain pulverant materials in relation to certain filter elements. There is no one filter material which is not clogged by a least some pulverant material which it was desirable to transport. It is obvious that when such clogging takes place it is necessary to interrupt the material transporting process and remove the filter for cleaning or replacement before the material transporting process can be resumed.

The material transporting device of the present invention provides a receiving chamber periodically evacuated through a filter element as hereinbefore mentioned. The device of this invention further provides, during the period when the receiving chamber is not evacuated, a filter cleaning, reversely directed, blast of air which serves the dual purpose of removing any filter clogging particles from the working surface of the filter and at the same time aids in bringing the internal pressure of the receiving chamber up to, or above, the pressure of the surrounding air so that the material deposited therein can flow outwardly as is desired. With the device of this invention it is possible to transport a wide variety of pulverant materials, including those having potentially troublesome clogging characteristics with regard to the filter material being used, without running into the clogging difficulty common to the filters of earlier devices.

Accordingly, a specific object of this invention to provide a new and improved material transporting device wherein a periodically evacuated material receiving chamber has a filter element for filtering air periodically removed from the chamber; wherein a filter cleaning, reverse blast of air is applied to the filter within a confined space to force the reverse blast of air through the side of the filter facing the transported material and remove filter clogging particles and raise the pressure within the receiving chamber substantially to that of the surrounding air.

These and other objects and advantages of this invention will become more fully apparent upon consideration of the following description and drawings in which:

FIG. 1 is a side elevational, partially sectional view of a material loader constructed according to the principles of this invention;

FIG. 2 is an enlarged fragmentary view of a portion of the loader shown in FIG. 1;

FIG. 3 is a top plan view of a filter assembly used in the device of FIG. 1;

FIG. 4 is a sectional view taken substantially on line 4—4 of FIG. 3;

FIG. 5 is a schematic representation of the electrical connections for the loader of FIG. 1.

In FIG. 1 there is shown a material loader, generally indicated at 10, comprising a hollow, generally cylindrical body 12 having a downwardly tapering, frusto-conical, lower portion 14 rigidly secured to a horizontally extending, generally circular mounting plate 16 having a central opening through which the lower portion 14 extends in a hollow cylindrical bottom portion 15. Rigidly secured about the outer surface of the bottom portion 15 is a resilient, tubular, downwardly extending, throat member 18 having diametrically opposed lower portions rigidly secured to outwardly extending throat hinges 20 which are in turn pivotally mounted on downwardly extending outrigger members 22 rigidly secured to a bottom surface of the mounting plate 16. The throat member 18 and associated parts form a bottom dumping valve for the body 12 characterized by the action of closing the opening at the bottom of the body 12 whenever pressure external to the body 12 is greater than the internal pressure within the body 12 and opening to allow material to flow downward therethrough whenever the pressure within the body 12 is equal to or greater than the ambient pressure. It is to be appreciated that such check type dumping valves are well known in the art and may be any one of the several types without departing from the scope of this invention.

The interior of the body 12 communicates through a suitable feed line 24 with a downwardly extending, telescopic feed pipe 26 more particularly shown and described in U.S. Patent 3,018,135. The lower end of the feed pipe 26 is submerged in a body of finely divided, granular or pulverized solid material 27 here shown as occupying the interior of a suitable material containing bin 25 partially shown in dotted outline in FIG. 1.

The material loaded 10 is shown for purposes of illustration as being mounted on an upper surface of a hopper 23 which is part of a machine (not shown) such as a plastic molding device requiring a generally constant supply of a granular or pulverized material.

The feed line 24 connects to the body 12 and communicates internally therewith through a connector 28 having an inwardly extending portion 29 extending across the inner opening of the body 12. The extended portion 29 is open downwardly into the body 12 so that the pulverized or granular material 27 flowing through the feed line 24 will be directed downwardly as it enters the body 12. Body 12 has an upper cylindrical portion 13, the upper edge of which is provided with a ring type, resilient sealing member 30 to provide a dust tight connection with an outwardly flanged cup shaped filter support member 32 having its flanged portion resting upon the sealing member 30 and its cup shaped portion extending downwardly within body 12 to a location upwardly adjacent the extended portion 29 of the connection 28 hereinbefore described. The filter support 32 has a large bore 33 coaxial with the cylindrical portion 13 which bore 33 is somewhat smaller than the outside diameter of a filter member 34.

Referring to FIGS. 3 and 4 it will be seen that the filter member 34 is generally disk shaped and comprises a flexible deformable tubing ring 36 formed from a piece of plastic tubing having its ends secured to a short piece of copper tubing 38, snugly fitting the inside diameter of the tubing, with the ends of the ring 36 being butted together. The filter member 34 further comprises a pair of porous filter disks 40 on opposite sides of the ring 36 with the edges of the disks 40 extending beyond the outer periphery of the ring 36. The disks 40 are continuously sewed together along their outer peripheries, as shown by a line 42 of elongated dashes, to form a complete cover over tubing ring 36. One of the filter disks 40 has an opening 44 in an intermediate portion thereof reinforced by a double rubber disk patch 45 the opening 44 closely receiving in fluid tight relationship a short metallic tube 48 having a bottom end (not shown) substantially coplanar with the lower surface of the disk patch 45 for a purpose to be hereinafter described.

Referring again to FIG. 2 there is shown a cup shaped clamping member 50 of a suitable diameter to nest within the filter support 32 so that its bottom portion engages the upper surface of the filter member 34 and clamps the filter member 34 in contact with the filter support 32. The clamping member 50 has a plurality of bores 51 providing a large open area to allow air to pass freely upwardly through the filter member 34. Interposed between the flanges of the filter support 32 and the clamping member 50 is a circular cross section, ring type, resilient member such as an O ring 52 to allow a portion of any force applied downwardly to the flange of the clamping member 50 to distort the O ring 52 and transmit clamping pressure to the bottom surface of the clamping member 50 to distort the ring 36 so that the filter member 34 is rigidly secured in place.

Removably secured on the top surface of the clamping member 50 and forming a closure for the upper end of the body 12 is a generally circular, shallow inverted cup shaped top cover 54 having a turned down edge portion internally engaged with the outer periphery of the sealing member 30 to produce a dust tight closure of the body 12. The top cover 54 is held in place and downwardly biased by spring type clamps 56 (only one of which is shown). The clamps 56 apply a sufficient downward force to the top cover 54 against the upper surface of the clamping member 50 to slightly flatten the O ring 52 and the ring 36 as hereinbefore mentioned.

The top cover 54 has a central opening (not shown) over which is mounted an air pump 58 of any suitable type powered by a suitable electric motor 60 suitably connected as hereinafter more fully described with the power lines supplying electric power to the machine on which the material loader 10 is mounted. The motor 60 is suitably electrically connected by a suitable two conductor cable 62 to an electrical timing device 64 which is in turn connected by a suitable two conductor cable 66 to a material sensing level switch 68 of a type well known in the art which has a downwardly extending vertically adjustable material sensing element 70 so positioned and adjusted that when the granular material from the bin 25, transferred to the hopper 23 by the material loader 10, reaches a predetermined height indicated by the line 72, the sensing element is moved horizontally outwardly away from the center of the bin 25 and actuates the level switch 68 into an open position.

Also connected to the timer 64 by a suitable cable 74 is the solenoid portion 75 of a solenoid operated, tripping type valve 76 of a type well known in the art, characterized by cocking action being accomplished when the solenoid 75 is energized, which cocking action maintains the valve in a closed position until the solenoid 75 is deenergized at which time the valve 76 opens for a short but controlled length of time after which the valve 76 closes and does not open again until the solenoid has been subsequently energized and thereafter deenergized. The valve 76 is suitably connected by a fluid conducting line 77 to a suitable source of compressed air (not shown) and communicates through suitable piping connection 78, extending through the top cover 54, with the tubing 48 which in turn communicates with the interior of the filter member 34 through the opening 44 as hereinbefore described.

FIG. 5 is a schematic representation of the electrical connections necessary for the operation of the material loader 10 according to the principles of this invention. Cable 80 hereinbefore cited as connecting with a supply of electric current comprises the two mutually insulated conductors 81 and 81'. Conductor 81 connects with a conductor 67 within the cable 66 which in turn connects with the level switch 68. When the level switch 68 is closed an electrical circuit is established from the conductor 81 through the conductor 67 the level switch 68 and a second conductor 67', within the cable 66, connected to a conductor 73, in the cable 74, connected to the valve solenoid 75 which is in turn connected to a conductor 73' in the cable 74 which through suitable brushes is connected to a commutator 65. The commutator 65 when rotated at a preselected speed such as one revolution per minute establishes connection between the brushes for a period of 20 to 30 seconds during each one minute period of revolution of the commutator 65 so that for that period of time the conductor 73' is connected to the conductor 81' which completes the electrical circuit back to the source of supply. When the level switch 68 is closed another circuit also exists as seen by inspection of FIG. 5. This circuit comprises the conductor 81, the conductor 67, the level switch 68 and the conductor 67' which connects at a point within the timer 64 with a conductor 63, within the cable 62, which is connected to a terminal of the pump motor 60. The other terminal of the pump motor 60 is connected to a conductor 63', within the cable 62, which is connected to the commutator 65 through the same brushes hereinbefore mentioned and during the energized portion of the cycle is connected through the commutator 65 with the conductor 81' completing the circuit.

Operation of this device begins with the material loader 10 of this invention mounted on the hopper 23 of a machine requiring a continued supply of the material 27 from the bin 25. At the beginning of such operation the hopper 23 is empty causing the level switch 68 to be closed and the commutator 65 rotating at a speed of perhaps one revolution per minute in a clockwise direction as viewed in FIG. 5 is in a position where it has just established contact between the brushes so that the valve solenoid 75 is energized to cock the valve as hereinbefore described and the pump motor 60 is energized and operating in the usual manner. The pump motor 60 rotating the pump impeller (not shown) causes air to travel from the housing 12 outwardly through the pump 58 lowering the pressure within the housing 12 as is known. The lower pressure within the housing 12 causes the throat member 18 to collapse so that no air can enter the housing 12 from this direction. The lower pressure within the housing 12 is communicated through the connection 28 and the tube 24 to the telescopic feed pipe 26. Atmospheric pressure on the top surface of the pile of material 27 pushes material into the feed pipe 26, up through the tube 24 through the connector 28 into the housing 12 wherein it is directed in a downward direction by the extended portion 29 so that the material from the pile 27 falls into the lower portion 14 of the housing 12.

This filling action of the material loader 10 continues for the period of time (approximately thirty seconds) during which the commutator 65 maintains contact between the brushes and causes a substantial amount of material to be transferred from the pile 27 into the housing 12. At the end of the contact period of the commutator 65 the pump motor 60 and valve solenoid 75 are both deenergized so that the pump motor stops and at this time the valve 76 delivers a measured short burst of high pressure air into the interior of the filter member 34 through the connections 78 and 48 so that fine particles of the material being handled, such as plastic dust, which have gathered on the bottom surface of the filter member 34 are dislodged and, under the force of gravity, fall into the bottom portion 14 of the housing 12. The flow of air through the valve 76 continues only for a preselected length of time found necessary for the cleaning of the filter member 34.

The pump 58 being turned off and air being supplied through the valve 76 as hereinabove described, the vacuum within the housing 12 is destroyed and the weight of the material in the lower portion 14 opens the throat member 18 allowing the material to flow downward into the hopper 23. Such downward flow through the throat member 18 can continue until the commutator 65 having rotated one complete revolution reestablishes the contact between the brushes reenergizing the valve solenoid 75 and the pump motor 60 at which time the second cycle begins with the closing of the throat member 18 as a lower pressure is developed within the housing 12 as hereinbefore described.

Such normal cycling of the apparatus continues until the pile of material within the hopper 23 reaches a predetermined level such as that indicated by the line 72 at which time the sensing element 70 is contacted by the material within the hopper and pushed aside into the position shown in FIG. 5 so that the level switch 68 is opened. With the level switch in the open position the cycling of the device is interrupted and no more action takes place until the pile of material within the hopper 23 has been reduced below the level 72 so that the level switch 68 again closes. As soon as the level switch 68 closes the normal cycling of the apparatus is resumed and continues until the level 72 is again reached.

It is to be appreciated that the description of this device in relation to a particular use is merely illustrative and should not be taken as limiting the device of this invention to such use, as it might well be employed for transporting any finely divided material.

A preferred embodiment of this invention having herein been described and illustrated it is to be realized that modifications therein can be made without departing from the broad spirit and scope of this invention. It is therefore respectfully requested that this invention be interpreted as broadly as possible and be limited only by the prior art.

I claim:
1. A transporting device for granular material comprising, a vertically extending material receiving housing having a selectably openable discharge opening in a lower portion thereof and an outlet opening in an upper portion thereof, a hollow material inlet communicating with said housing at a location spaced upwardly of said discharge opening, a filter member comprising a hollow porous disk having a deformable outer periphery and extending completely across said housing at a location spaced upwardly from said inlet and downwardly from said outlet to divide the interior of said housing into upper and lower interior portions; means located within said housing engageable with said deformable outer periphery of said filter member to provide a peripheral air seal between said upper and lower interior portions; means carried by an upper portion of said housing for creating a vacuum within said upper interior portion of said housing with the air in said lower interior portion of said housing evacuating upwardly through said filter member and said outlet opening, said filter member having a completely enclosed chamber therein extending transversely across said housing, passageway means extending from within said chamber to an externally accessible portion of said housing, and selectively operable control means connected to said passageway means to control flow of pressurized air through said passageway into said chamber.

2. A material transporting device as set forth in claim 1 in which said control means includes means for controlling the operation of said means for creating a vacuum.

3. A material transporting device as set forth in claim 1 in which said control means includes timing means to control the time periods said means for creating a vacuum operates and said pressurized air flows into said chamber.

4. A material transporting device as set forth in claim 1 in which means for delivering pressurized air is connected to said externally accessible portion of said housing.

5. A transporting device for granular material comprising, a vertically extending material receiving housing having an upper open end and a selectably openable discharge opening in a lower portion thereof, a hollow material inlet communicating with said housing at a location spaced upwardly of said discharge opening, a filter member comprising a hollow porous disk having a deformable outer rim extending completely across said housing at a location spaced upwardly from said inlet and inwardly of said upper open end, said filter member being supported around the outer periphery thereof by said housing, a cover removably secured to said housing for enclosing said upper open end, said cover having a portion located within said housing engageable with said deformable outer periphery of said filter member, and said outer periphery of said filter member being resilient and yieldable to provide an air seal between said cover and said housing, means carried by said cover for evacuating the air in said housing below said filter member upwardly through said filter member, said filter member having a chamber completely enclosed therein and extending transversely across said housing; passageway means extending from within said chamber to an externally accessible portion of said housing to selectively admit pressurized air into said chamber; and selectively operable control means connected to said passageway means to control flow of pressurized air through said passageway means into said chamber.

References Cited by the Examiner
UNITED STATES PATENTS

| | | | |
|---|---|---|---|
| 920,739 | 5/1909 | Hedges et al. | 210—486 X |
| 1,123,155 | 12/1914 | Woodley | 302—66 |
| 1,133,543 | 3/1915 | Duffie | 55—337 |
| 1,407,510 | 2/1922 | Bentham | 302—341.9 |
| 1,918,764 | 7/1933 | Ljungquist | 55—492 X |
| 1,935,843 | 11/1933 | Goebels | 302—53 X |
| 2,215,282 | 9/1940 | Williams | 55—377 X |
| 2,576,310 | 11/1951 | Ruemelin | 55—377 |
| 2,966,960 | 1/1961 | Rochlin | 55—502 |
| 2,992,858 | 7/1961 | Pendleton | 302—17 |
| 3,019,905 | 2/1962 | Baker et al. | 210—486 |
| 3,073,097 | 1/1963 | Hallett et al. | 55—283 |
| 3,169,038 | 2/1965 | Pendleton | 302—59 |
| 3,178,868 | 4/1965 | Gibby | 55—302 X |
| 3,180,071 | 4/1965 | Nolte | 55—215 X |

ROBERT F. BURNETT, *Primary Examiner.*
HARRY B. THORNTON, *Examiner.*